UNITED STATES PATENT OFFICE.

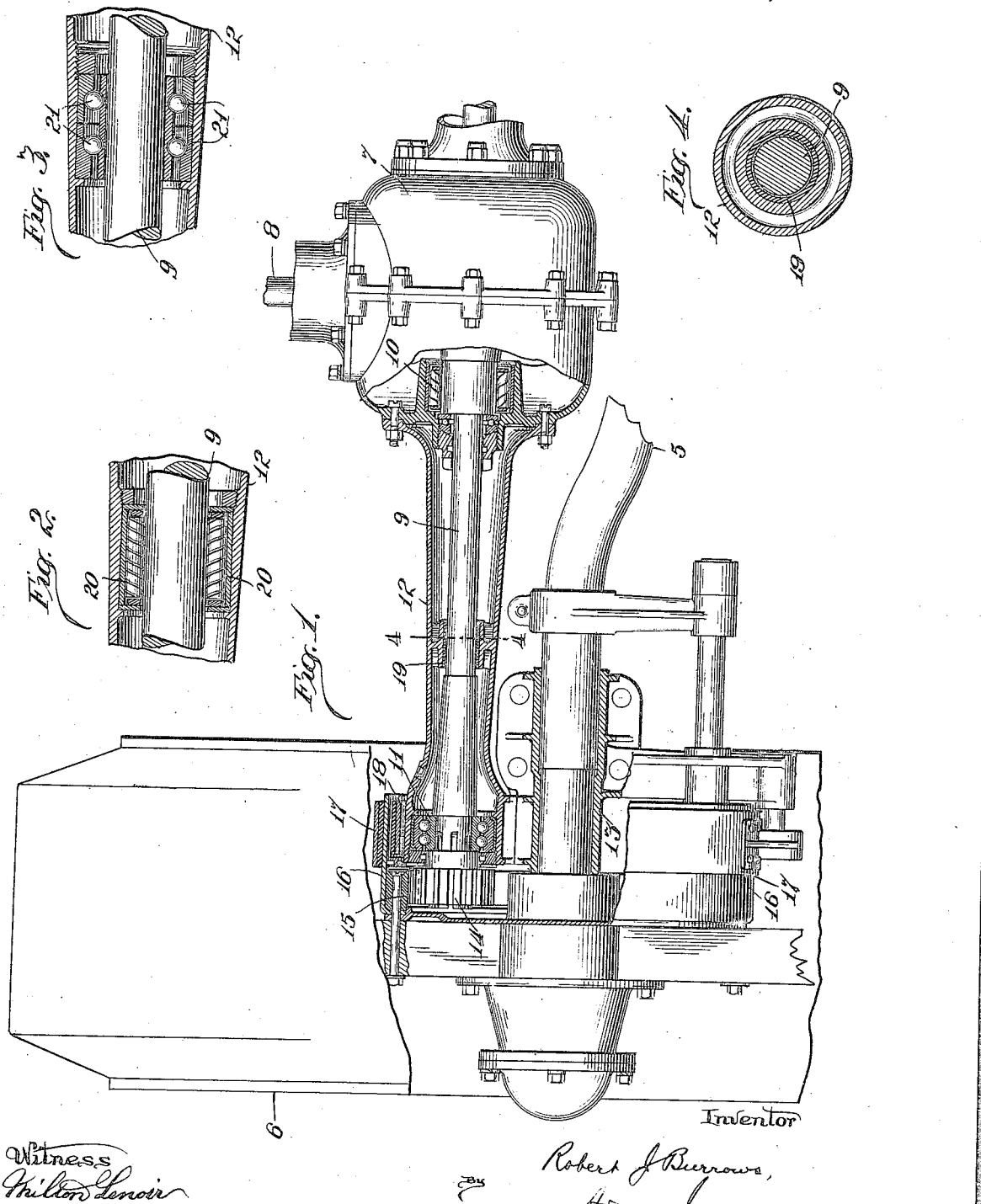

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

1,427,089.   Specification of Letters Patent.   Patented Aug. 29, 1922.

Application filed February 27, 1920. Serial No. 361,851.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to vehicle axles of the type in which the propelling wheels are mounted upon spindles carried by a dead axle member, and are driven by a live axle member comprising jack shafts connected at their inner ends with the usual differential gearing, and provided at their outer ends with pinions which mesh with driving gears carried by the wheels of the vehicle. In such axles the outer end portions of the jack shafts are usually supported by bearings adjacent to the inner ends of the pinions referred to so that the pinions overhang, or lie beyond, the bearings at the outer ends of the jack shafts. Axles of this character, one of which is shown and described in my pending application, Serial No. 310,425, filed July 12, 1919, are usually applied to trucks and other heavy load carrying vehicles, and, as pointed out in my said application, experience has shown that when running on low gear, as in starting, or under other conditions where heavy strain is imposed upon the driving gears, the jack shafts have a tendency to buckle or be deflected intermediately, with the result that the outer end portions thereof are tilted or deflected in such manner that the teeth of the pinions do not mesh properly with the teeth of the driving gears so that the teeth are apt to be damaged. In my said application I have shown and described the use of an intermediate bearing for the jack shaft designed to prevent material deflection or buckling of the intermediate portion thereof under the conditions described, thereby avoiding the necessity of making the jack shaft extra heavy. My present invention has the same object in view, and also the further object of providing certain improvements in the generic invention which forms the subject-matter of my said pending application. The nature of such improvements will appear from the following description thereof and the accompanying illustrations. What I regard as new will be set forth in the claims.

In the drawings, in which I have illustrated my invention as applied to an axle in which the differential housing and the jack shafts are arranged in front of the dead axle member,—

Fig. 1 is a partial plan view, some parts being in section;

Figs. 2 and 3 are details showing modifications; and

Fig. 4 is an enlarged vertical cross-section on line 4—4 of Fig. 1.

Referring to the drawings,—5 indicates the dead axle member which is provided with the usual wheel spindles at its ends, and 6 indicates one of the wheels. 7 indicates the usual differential housing which encloses suitable differential gearing driven by a propeller shaft 8, or other suitable means, from any suitable source of power, such as an internal combustion motor. 9 indicates the jack shafts, the inner ends of which are fitted in bearings 10 in the differential housing 7, while their outer end portions are fitted in bearings 11 mounted in the outer end portions of sleeves 12. The inner ends of these sleeves are connected with the differential housing 7, while their outer ends are connected with the outer end portions of the dead axle member 5 by means of suitable brackets 13. Any construction suitable for this purpose may be employed, and as my present invention is not concerned with the particular devices used for connecting the outer end portions of the sleeves 12 with the dead axle member it is unnecessary to describe in detail the devices used for that purpose. In Fig. 1 I have shown roller bearings 10 at the inner ends of the jack shafts and ball bearings 11 at the outer end portions thereof, but bearings of any other suitable type may be employed.

At their outer ends the jack shafts 9 carry pinions 14 which, as shown at Fig. 1, are outside of and adjacent to the bearings 11 and adapted to mesh with suitable gears carried by the wheels 6. In the drawings I have shown the wheels as provided with internal gears 15, as that is the construction which I prefer to employ. 16 indicates brake drums carried by the wheels, which extend over the gears 15 and the outer end portions of the sleeves 12, these brake drums being adapted to cooperate with external brakes 17 and internal brakes 18 as shown. The mechanism by which the brakes are operated need not be described as it has nothing to do with my present invention.

19 indicates an intermediate tubular bearing mounted in the sleeve 12, preferably about midway of its length, and embracing the jack shaft 9. This bearing, which may be either a plain bearing, as shown in Fig. 1, a roller bearing, as shown at 20 in Fig. 2, or a ball bearing, as shown at 21 in Fig. 3, is preferably slightly larger as to its internal diameter than the jack shaft 9 so that normally the shaft is not in contact with it, but when deflected slightly intermediately in any direction it is adapted to engage the bearing and be sustained by it against further deflection. By this means the pinion 14 is always held properly in mesh with the driving gear 15 no matter how great the strain that is placed upon the driving connections. By mounting the intermediate bearing in a rigid sleeve that is connected at one end with the differential housing and at the other end is connected with the dead axle member the three bearings of each jack shaft are held in axial alinement with each other so that the jack shaft is always held properly in position. Also by placing the intermediate bearing in the sleeve 12 it is protected from dirt and may be lubricated by seepage of lubricant from the outer bearing 11. The advantage of making the intermediate bearing slightly larger than the diameter of the jack shaft is that by that arrangement it requires very little lubricant as it functions as a bearing only when the jack shaft is deflected sufficiently to come into contact with it, and this occurs only when the jack shaft is subjected to abnormal strains tending to deflect it. The jack shaft may be removed and replaced when desired by removing the wheel and the outer bearing 11, when the jack shaft may be drawn out of the sleeve 12, as its inner end fits the inner bearing 10 by a sliding fit in the usual way.

What I claim as my invention and desire to secure by Letters Patent, is—

1. A motor vehicle axle comprising a dead axle member, a differential housing, jack shafts having bearings at their inner end portions in said differential housing, sleeves rigidly connected with said differential housing and supported at their outer ends by said dead axle member, said sleeves enclosing said jack shafts, tubular intermediate bearings for said jack shafts mounted in and enclosed by said sleeves, bearings for the outer end portions of said jack shafts, and pinions carried by said jack shafts outside of the latter bearings.

2. A motor vehicle axle comprising a dead axle member, a differential housing, jack shafts having bearings at their inner end portions in said differential housing, sleeves rigidly connected with said differential housing and supported at their outer ends by said dead axle member, said sleeves enclosing said jack shafts, tubular intermediate bearings for said jack shafts mounted in said sleeves, said intermediate bearings being normally out of contact with said jack shafts, bearings mounted in said sleeves for the outer end portions of said jack shafts, and pinions carried by said jack shafts outside of the latter bearings.

3. A motor vehicle axle comprising a dead axle member, a differential housing, jack shafts having bearings at their inner end portions in said differential housing, sleeves rigidly connected with said differential housing and supported at their outer ends by said dead axle member, said sleeves enclosing said jack shafts, tubular intermediate bearings for said jack shafts mounted in said sleeves, bearings for said jack shafts mounted in the outer end portions of said sleeves, and pinions carried by said jack shafts outside of the latter bearings.

4. A motor vehicle axle comprising a dead axle member, a differential housing, jack shafts having bearings at their inner end portions in said differential housing, rigid members connected with said differential housing and supported at their outer ends by said dead axle member, tubular intermediate bearings for said jack shafts carried by said members, bearings for said jack shafts carried by the outer end portions of said members, and pinions carried by said jack shafts outside of the latter bearings.

ROBERT J. BURROWS.